June 18, 1946.  G. R. WOOD  2,402,519
FOOD SLICING MACHINE
Filed Aug. 18, 1942  6 Sheets-Sheet 1
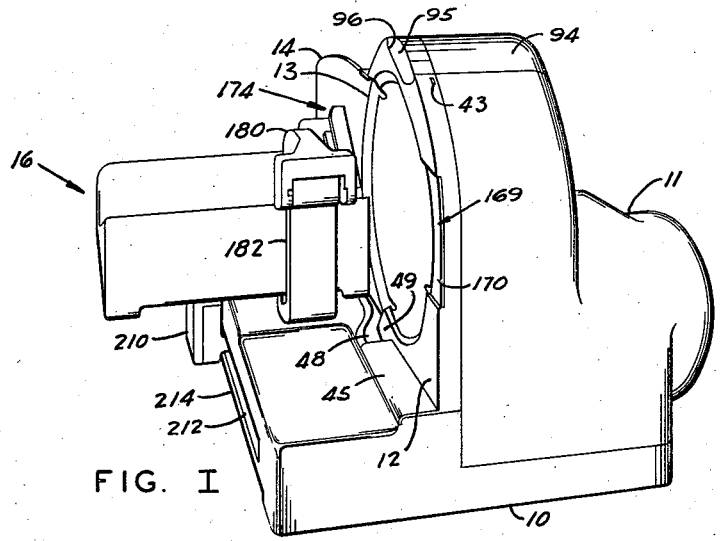
FIG. I
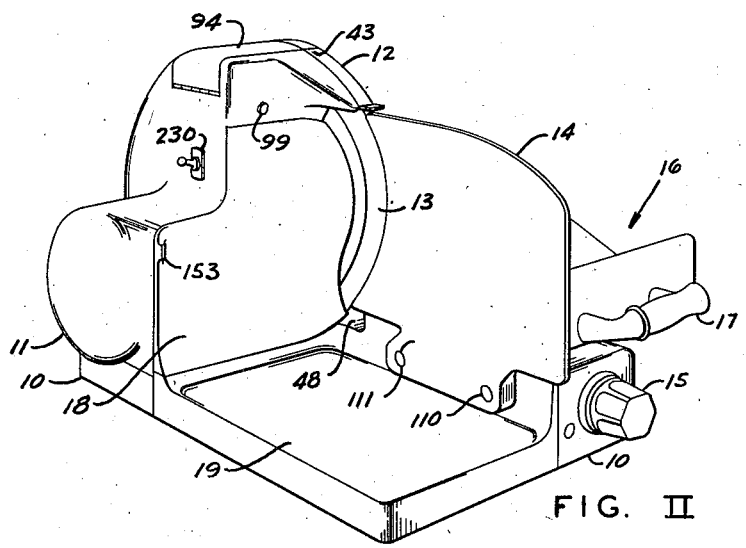
FIG. II
GEORGE R. WOOD
INVENTOR
BY
ATTORNEY

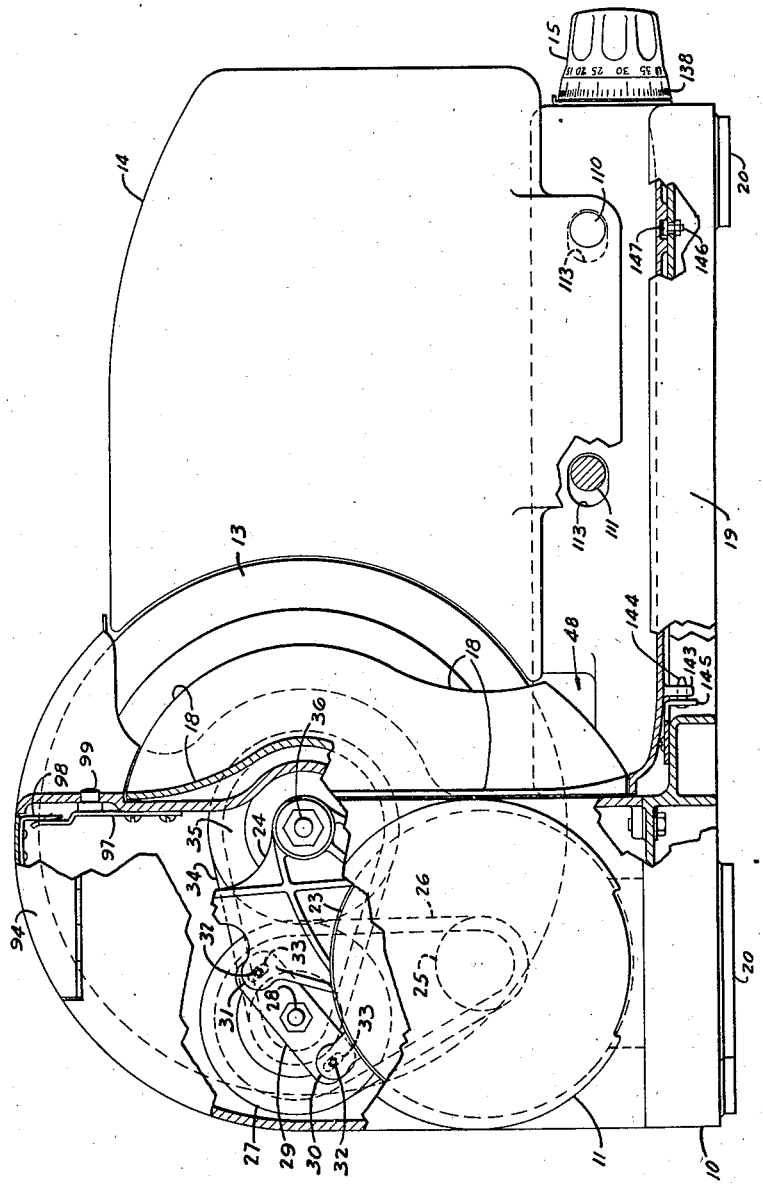

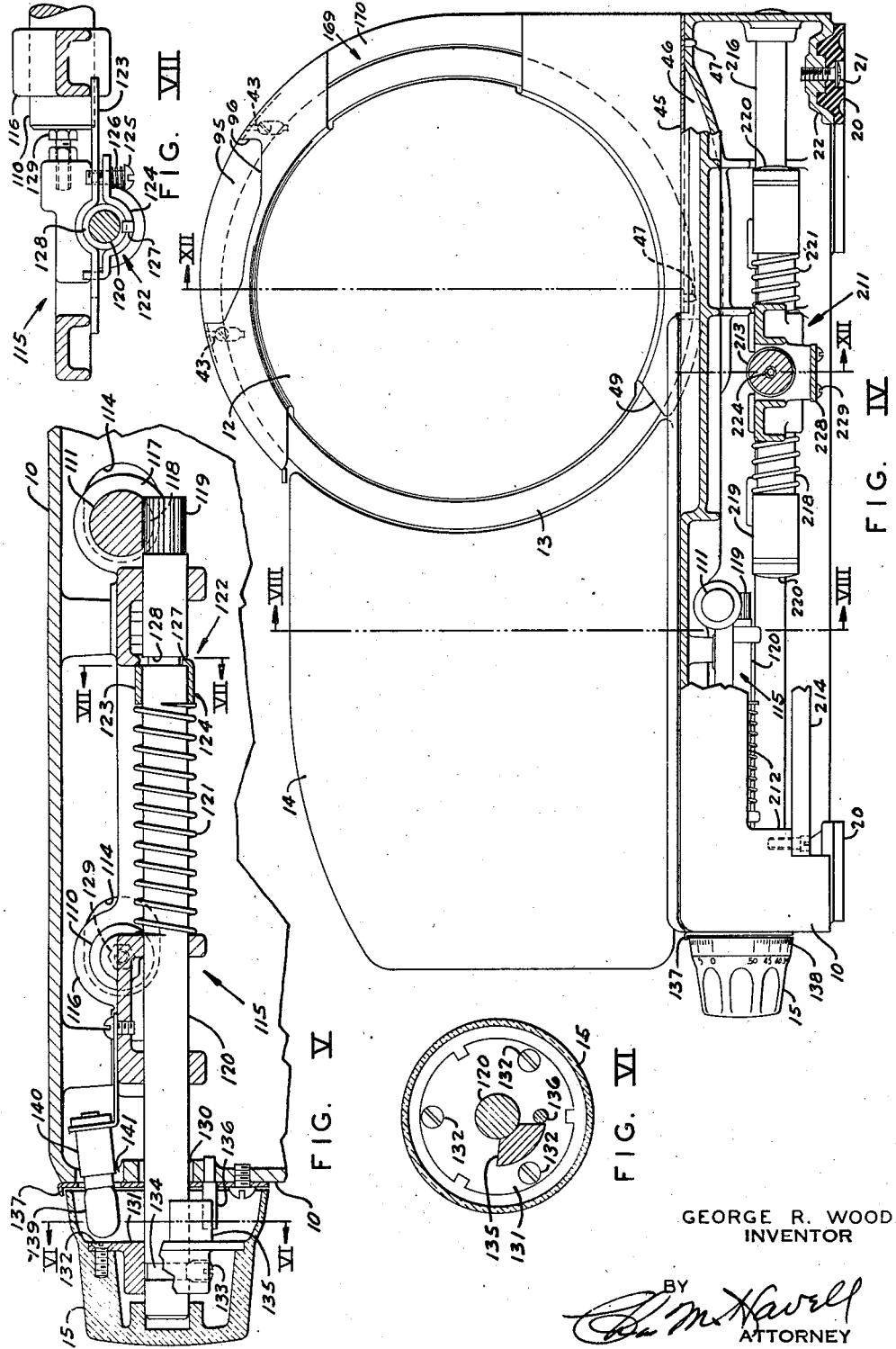

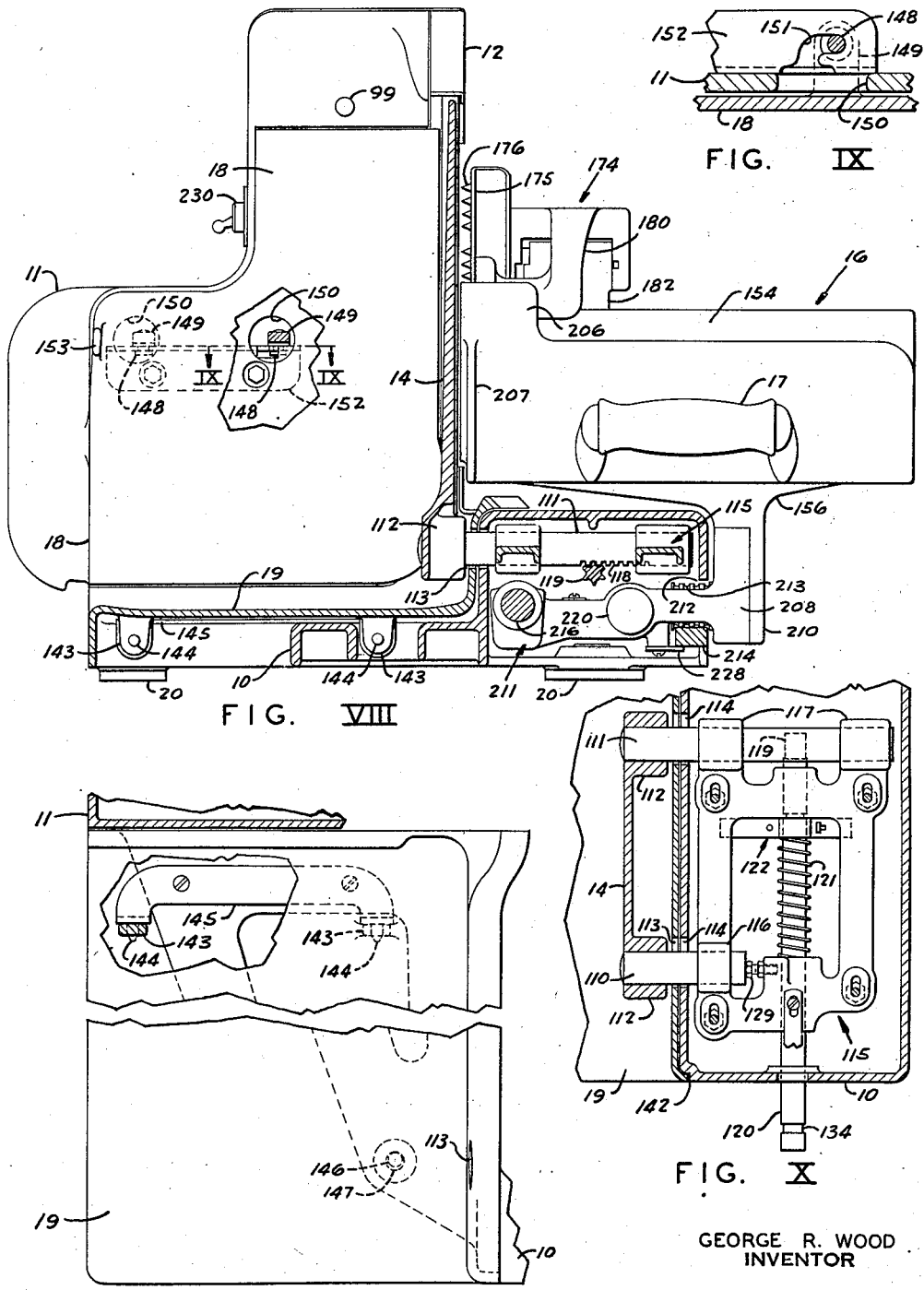

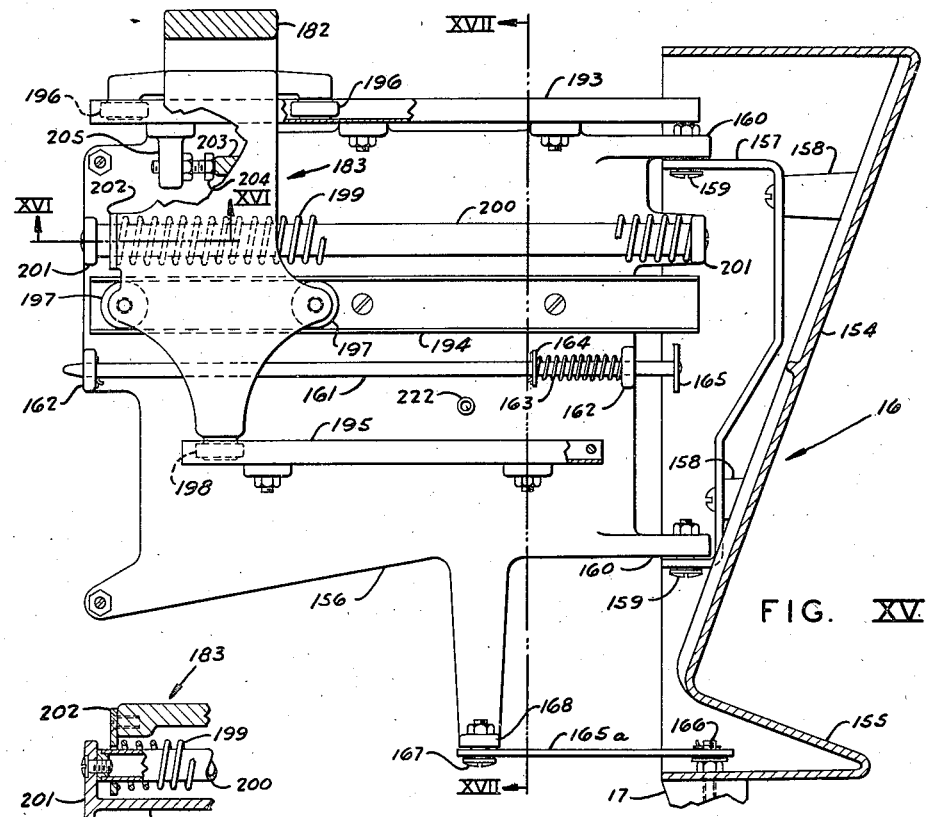
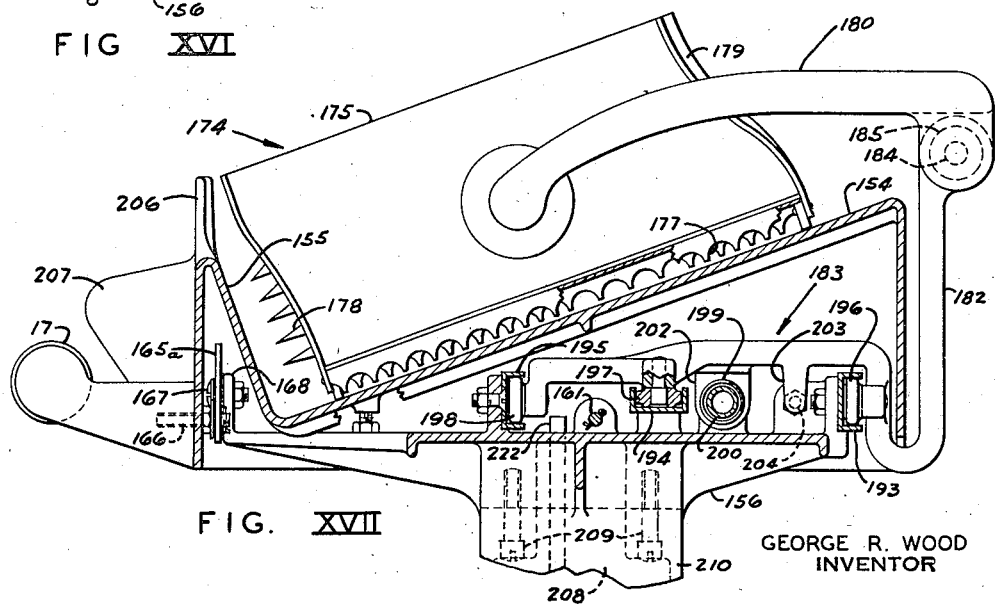

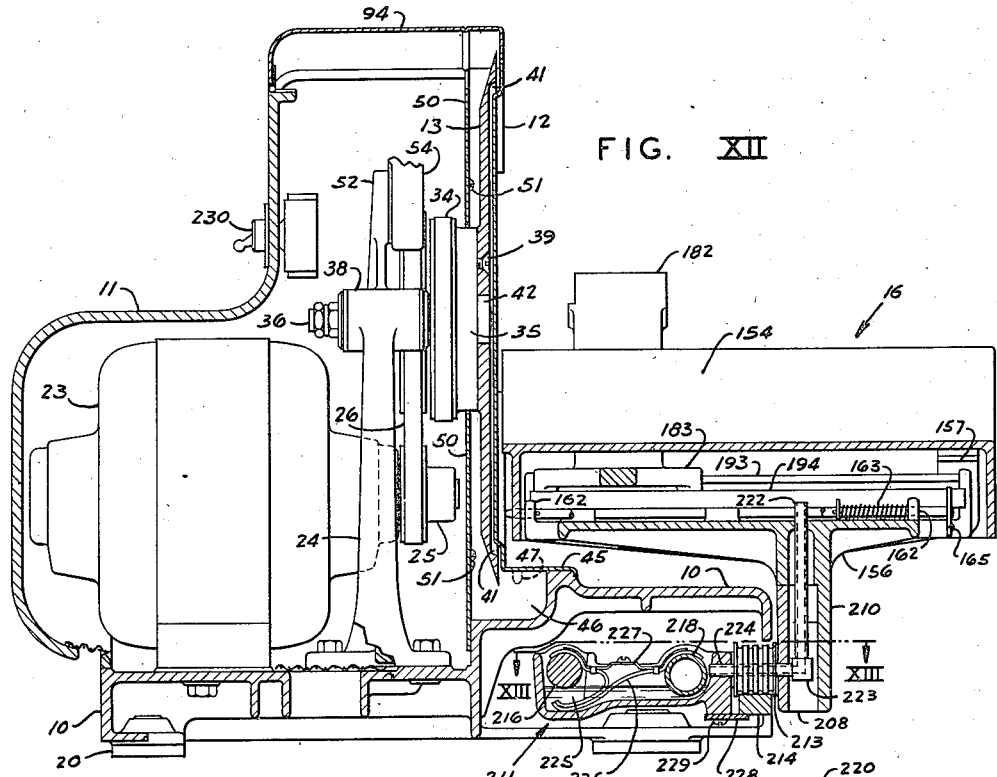
FIG. XII
FIG. XIII
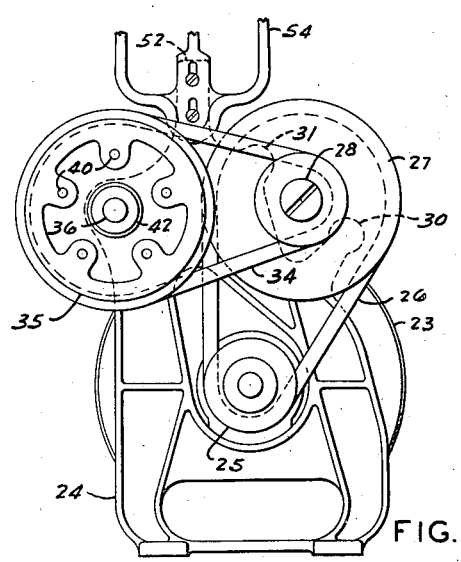
FIG. XIV
GEORGE R. WOOD
INVENTOR
ATTORNEY Patented June 18, 1946

2,402,519

UNITED STATES PATENT OFFICE 2,402,519

FOOD SLICING MACHINE

George R. Wood, Montreal, Quebec, Canada, assignor to Toledo Scale Company, Toledo, Ohio, a corporation of New Jersey Application August 18, 1942, Serial No. 455,232

3 Claims. (Cl. 146—102)

This invention relates to food handling apparatus for the slicing of commodities into slices of various thicknesses.

It is an object of this invention to provide a slicing machine in which the various parts are designed to provide a compact, easily operable and easily cleaned machine.

It is another object of this invention to provide a slicing machine with a positive spring feed and a commodity-carrying tray which is easy to operate and clean.

Another object of this invention is to provide a slicing machine in which the commodity tray is mounted to facilitate its operation and to support centrally the weight of the commodity being sliced.

It is a still further object of this invention to provide, in a unitary base for a slicing machine, mounting means for the movable parts of the machine arranged so as to prevent the entry into the base of any scrap material falling from the commodity being sliced.

More specific objects and advantages are apparent from the description, in which reference is had to the accompanying drawings illustrating a preferred form of machine embodying the invention.

In the drawings:

Fig. I is a view in perspective showing the rear right corner of a slicing machine embodying the invention.

Fig. II is a view in perspective showing the left front corner of the slicing machine illustrated in Fig. I.

Fig. III is a side elevational view, on an enlarged scale, of the slicing machine shown in Figs. I and II, certain parts being broken away and certain parts being shown in section.

Fig. IV is a side elevational view, taken from the opposite side of the machine from that shown in Fig. III and with the commodity tray removed.

Fig. V is a fragmentary view, on a greatly enlarged scale, of gauge plate controlling mechanism incorporated in a slicing machine embodying the invention.

Fig. VI is a detailed vertical sectional view, taken substantially on the line VI—VI of Fig. V.

Fig. VII is a detailed vertical sectional view, taken substantially on the line VII—VII of Fig. V.

Fig. VIII is a vertical sectional view, taken substantially from the position indicated by the line VIII—VIII of Fig. IV.

Fig. IX is a fragmentary detailed view, taken substantially on the line IX—IX of Fig. VIII.

Fig. X is a detailed plan view of portions of the mechanism shown in Fig. V but on a reduced scale.

Fig. XI is a fragmentary plan view of a slice-receiving platter and the means for mounting the platter on the base.

Fig. XII is a vertical sectional view, taken substantially on the line XII—XII of Fig. IV.

Fig. XIII is a detailed view, taken substantially from the position indicated by the line XIII—XIII of Fig. XII.

Fig. XIV is a fragmentary view in elevation of knife driving mechanism incorporated in a slicing machine embodying the invention.

Fig. XV is a plan view, on an enlarged scale, of commodity tray supporting means.

Fig. XVI is a fragmentary detailed view, taken substantially on the line XVI—XVI of Fig. XV.

Fig. XVII is a vertical sectional view, taken substantially on the line XVII—XVII of Fig. XV.

These specific drawings and the specific description that follows merely disclose and illustrate the invention and are not intended to impose limitations upon the claims.

A slicing machine embodying the invention comprises a base 10 (Fig. I) atop the rear left portion of which there is mounted a motor and drive housing 11. A unitary knife guard 12 encloses a circular knife 13 with the exception of a portion of the edge of the knife 13 which is exposed for slicing commodities. A gauge plate 14 is mounted with its face in a plane parallel to the plane of the edge of the knife 13, and it is movable horizontally at right angles to the plane of its face. The forward edge of the gauge plate 14 is curved with substantially the same radius as the cutting edge of the knife 13 and fits closely adjacent thereto. The gauge plate 14 is laterally adjustable by means of a rotatable adjusting knob 15 which is mounted outside the front edge of the base 10. A commodity tray 16, which has a handle 17, is mounted to reciprocate fore and aft along one side of the base 10 and to carry a commodity slidingly along the face of the gauge plate 14 and past the exposed portion of the knife blade 13. A deflector plate 18 is mounted on the forward side of the motor and drive housing 11, and is behind the exposed edge of the knife 13, serving to deflect slices of commodity cut off by the knife 13 onto a slice-receiving platter 19 which is located at the left of the gauge plate 14 and in front of the deflector plate 18.

The base 10 rests on three rubber feet 20, one of which is located at the front right corner and one of which is located at each of the rear corners of the device. Each of the rubber feet is secured to the base by means of a screw 21 (Fig. IV) threaded into a boss 22 in the base 10.

Mounted atop the left rear portion of the base 10 is the unitary motor and drive housing member 11 which encloses a driving motor 23 bolted to the base 10 (Fig. XII) and a drive mounting frame 24 which is also bolted to the base 10 and located at the right end of the motor 23. A drive pulley 25 (see also Figs. III and XIV) is keyed on the end of the shaft of the motor 23 and drives a V belt 26 which is also engaged in the larger sheave of a dual sheave pulley 27. The pulley 27 is journaled on a shaft 28 which is bolted to a link 29. The link 29 is, in turn, adjustably secured to two ears 30 and 31 of the frame 24 by means of bolts 32 which extend through elongated holes 33 in the ears 30 and 31. The smaller sheave of the dual pulley 27 drives a V belt 34 which also is engaged in a V groove in a knife hub 35. The knife hub 35 is press-fitted on the end of a stub shaft 36 which is journaled by needle bearings in a horizontally bored boss 38 near the upper end of the drive mounting frame 24.

The circular knife 13 is secured to the knife hub 35 by means of five angularly-spaced screws 39 which are threaded into five angularly-spaced holes 40 drilled in the knife hub 35 (Fig. XIV). The knife 13 has a dish-like depression 41 (Fig. XII) in its outermost face and a hole at its center which fits over a stud-like pointed projection 42 forming the center of the knife hub 35.

The housing 11 in its upper portion is arcuate and substantially coaxial with the circular knife 13. The knife 13 is guarded by means of the unitary knife guard 12 which conforms in shape with, and blends into, the housing 11, being held in position thereon by means of two clips 43 (Fig. IV) which are attached by means of screws near the upper edge of the housing 11 and extend upwardly into two vertical slots cut in the turned-over lip of the knife guard 12. The central portion of the knife guard 12 is dished and conforms substantially to the shape of the circular knife 13. The center portion of the knife guard is supported away from the knife by the pointed projection 42 of the knife hub 35. The center portion of the knife guard serves two functions. First, it protects the center portion of the knife from grease and dirt and, second, it furnishes a stationary surface over which the commodity can be moved more easily than over the center portion of the rotating knife even if flush across the face of the knife. The lower edge of the knife guard 12 is turned horizontally, forming a flat shelf 45 (Figs. I, IV and XII) which extends over a crumb-trough 46 into which the lower edge of the circular knife 13 extends. The trough 46 is formed in the upper surface of the right rear portion of the base 10. The shelf 45 covers the trough 46 and is curved over, blending into and conforming with the shape of the top surface of the base 10. The knife guard is held in position with the shelf 45 over the trough 46 by a pair of vertical pins 47 (Figs. IV and XII) which are riveted to the shelf 45 and extend downwardly into holes bored in the upper surface of the base 10.

The trough 46 extends fore and aft beneath the circular knife 13 and has an open end 48 (Figs. I and II) above the innermost corner of the slice-receiving platter 19. That portion of the edge of the circular knife 13 which projects over the opening 48 of the trough 46 is guarded by means of a foot guard 49 (Figs. I and IV) which is formed integrally with the unitary knife guard 12. The trough 46 is closed off from the interior of the motor and drive housing 11 by means of a partition 50 (Fig. XII) which also extends between the inner side of the circular knife 13 and the interior of the housing 11 and is secured to the housing 11 by means of screws 51 (Fig. XII) and the screws 44 holding the clips 43. This partition prevents any grease or dirt, or particles of commodity from entering the motor and drive housing 11. The trough 46 gives clearance around the lower edge of the circular knife 13 so that it can be effectively cleaned without being removed from the knife hub 35.

Sufficient space is left within the upper part of the housing 11 so that a sharpening device consisting of a pair of circular stones may be mounted therein. A stand 52 extending up into this space supports the lower end 54 of the sharpening device. The sharpening device normally lies retracted in the space immediately above the stand 52. When it is desired to use the device a trap door 94 closing the top of the housing 11 may be opened to expose the sharpening device and allow it to be moved into operative position over the edge of the circular knife 13.

The trap door 94 is designed to blend smoothly into the contour of the housing 11 and such smoothness precludes using any knob or external catch for opening it. It is, therefore, provided with a spring tending to open it and a catch located within the housing and actuated by a button 99 (Fig. I) which when pressed releases the catch and allows the spring to open the trap door 94.

*Gauge plate mechanism*

The gauge plate 14 is mounted with its face in a plane parallel to the cutting plane of the circular knife 13 on two rods 110 and 111 (Figs. II, III, IV, V, VIII and X). The two rods 110 and 111 are force-fitted into two bosses 112 (Fig. X) formed on the lower portion of the gauge plate 14. The two rods 110 and 111 extend horizontally through two elongated holes 113 (Figs. III and X) cut through the vertical right side wall of the slice-receiving platter 19 and through two similar holes 114 cut in the left wall of the base 10. The edge of the gauge plate adjacent the edge of the circular knife 13, is cut with a complementary radius so that the gauge plate fits closely adjacent to the edge of the knife. The rods 110 and 111 are horizontally slidable in a gauge plate frame 115 (Figs. IV, V and X) which is adjustably bolted to the base 10 and can be moved toward the circular knife 13 to move the gauge plate toward the circular knife as the diameter of the knife becomes smaller due to sharpening and grinding. The rod 110 is horizontally slidable in a bored boss 116, and the rod 111 is horizontally slidable in a pair of bosses 117.

Rack teeth 118 (Fig. VIII) are cut in the undersurface of the rod 111 and are engageable by a pinion 119 (see also Fig. V) fixed in the end of an indicator shaft 120 which is rotatably mounted transversely to the rods 110 and 111 in the gauge plate frame 115. The indicator shaft 120 is both rotatable and longitudinally movable with respect to the cross members of the gauge plate frame 115 in which it is journaled. A coiled spring 121 surrounds the shaft 120 and is located between the two cross members of the frame 115, one end of the spring being pressed against one of the cross members and the other end of the spring being pressed against a split clamping member 122 (Figs. V, VII and X). The clamping member 122 comprises a flat top plate 123 which passes over the top of the shaft 120 and extends across beneath the two side members of the gauge plate frame 115, and a bottom plate 124 which is hooked through a T slot in the top plate 123 on one side of the shaft 120 and passes beneath the shaft, being secured on the other side by means of a screw 125 which passes freely through a hole in the bottom plate 124 and is threaded into the top plate 123. A small coil spring 126 is located between the head of the screw 125 and the bottom surface of the bottom plate 124. The clamping member 122 is not clamped tightly enough around the shaft 120 to bind it, but only tight enough to maintain an upturned finger 127 on the bottom plate 124 in an annular slot 128 turned in the shaft 120. The edge of the upper plate 123 abuts against the inner edge of the cross member of the frame 115.

A horizontal adjustable stop screw 129 is threaded into the gauge plate frame 115 in line with the inner end of the rod 110, and serves to limit the movement of the rod 110 into the frame 10 and thus the adjustment of the gauge plate 14 to the right in Figs. VIII and X. The stop screw 129 is normally adjusted so that when the end of the rod 110 is against it the face of the gauge plate 14 is directly in the plane of the cutting edge of the knife 13.

The indicator knob 15 is mounted in the outermost end of the shaft 120, which projects through a hole 130 in the forward end of the base 10, by means of a collar 131 (Fig. V) which is secured in the hollow interior of the knob 15 by means of screws 132 and which carries a set screw 133 engageable in an annular groove 134 turned in the shaft 120 near its end. The collar 131 also has a keystone-shaped stop 135 which cooperates with a pin 136 projecting from the front wall of the base 10 into the interior of the knob 15 for limiting the rotation of the knob 15 and the shaft 120 and thus the travel of the gauge plate 14 which is moved by the pinion 119 and rack teeth 118. An indicator 137 is secured on the outer wall of the base 10 and projects above the periphery of the knob 15 for cooperation with a series of slice thickness indicia 138 (Fig. IV) inscribed on the periphery of the knob 15. A small lamp 139 is mounted in a socket 140 attached to the gauge plate frame 115 and projects through a hole 141 in the end of the base 10 into the interior of the knob 15 (which is preferably made of translucent material) to illuminate the indication.

Rotation of the knob 15 thus translates the gauge plate in a direction at right angles to the plane of its face. The distance through which the gauge plate has been moved determines the thickness of the slice of commodity that is severed when the main portion of the commodity is moved along the face of the gauge plate and against the edge of the circular knife 13. Because of the location of the gauge plate to the left of the upwardly turned portion of the slice-receiving platter 19, any crumbs or pieces that may be rubbed or broken off the commodity as it is moved across the gauge plate fall downwardly upon the slice-receiving platter whence they easily can be removed. To facilitate cleaning of the upwardly turned portion of the slice-receiving platter and the face of the gauge plate, the gauge plate is removable. This is accomplished by pulling on the knob 15, which moves the shaft 120 longitudinally, sliding the clamping member 122 along on the underside of the gauge plate frame 115 and disengaging the pinion 119 from the rack teeth 118 in the rod 111. The gauge plate may then be removed by sliding the two rods 110 and 111 out of the bosses 116 and 117 and out of the two sets of holes 114 and 113. To replace the gauge plate, the rods 110 and 111 are inserted through the holes 113 and 114 and into their respective bosses, the knob 15 released and the expansion of the spring 121 slides the shaft 120 back into position with the pinion 119 engaged in the rack 118.

Slice-receiving platter

The slice-receiving platter 19, which, in the embodiment of the invention disclosed, is a single unitary casting (Figs. II, III, VIII and XI), extends upwardly at its right side and overlaps the upper left-hand edge of the right-hand portion of the base 10 (Fig. VIII). The forward edge of the slice-receiving platter 19 is curved and fits into a cove 142 (Fig. X) blending with the contour of the base 10. The front and left edges of the slice-receiving platter 19 are turned over and carried downwardly (Fig. II), thus forming a continuous line with the bottom edge of the base 10. The rear side of the slice-receiving platter is shaped and turned upwardly blending into the contour of the lower edge of the deflector plate 18 (Figs. II and III).

The slice-receiving platter is held in place on the base 10 by the engagement of a pair of drilled ears 143 (Figs. III and XI), which extend downwardly from the undersurface of the slice-receiving platter, with two pins 144 which are riveted to the downwardly turned ends of a C shaped bracket 145 which is screwed to a portion of the main base 10 located beneath the slice-receiving platter 19. The platter 19 is held on the pins 144 by the engagement of a bolthead 146, which projects upwardly from the frame 10, with a socket 147 located in the undersurface of the platter 19. As can be seen in Figs. VIII and XI particularly, that portion of the frame which is located beneath the slice-receiving platter 19 is cut off at an angle beneath the platter. This eliminates useless weight in the base, and does not detract from the appearance of the machine because of the turned-over edges of the slice-receiving platter which are in line with the right and rear portions of the base and thus give a finished appearance to the base.

When it is desired to remove the slice-receiving platter, the gauge plate is first removed, as explained above, and then the forward edge of the slice-receiving platter is lifted to disengage the bolthead 146 from the socket 147, and the slice-receiving platter is pulled forwardly, disengaging the ears 143 from the pins 144.

Deflector plate

The deflector plate 18 is mounted on the forward side of the motor and drive housing 11 above the rear edge of the slice-receiving platter 19. The deflector plate is curved and formed at its right side, i. e., that portion located adjacent the rear of the circular knife 13, to deflect slices of commodity which are severed by the knife 13 so that they will fall on the slice-receiving platter 19, or so that an operator easily can catch them as they are severed by the knife. The contour of the upper and left edges of the deflector plate is blended into that of the motor and drive housing 11. The deflector plate is held in place by means of two buttons 148 (Figs. VIII and IX) which extend downwardly from a pair of horizontal lugs 149 which are formed on the concealed side of the deflector plate and which, when the deflector plate is in position, extend into the interior of the motor and drive housing 11 through two holes 150 therein. The buttons 148 are engaged in a pair of L shaped keyhole slots 151 cut in a right angle bracket 152 which is bolted to the interior wall of the housing 11. The slots 151 are cut in both the vertical and the horizontal pieces of the bracket 152, and thus the buttons 148 may be moved horizontally through the portions of the slots 151 in the vertical section of the bracket 152 and engaged beneath the horizontal section of the bracket 152, the flat portions of the buttons being too large to pass through the curved sections of the slots 151, which portions of the slots fit the shanks of the buttons. Thus when the buttons are inserted to the limit of the slots 151, the deflector plate is supported and correctly positioned-vertically, by the lugs 149 resting on the horizontal portion of the bracket 152; back of the knife, by the shanks of the buttons 148 being inserted to the limit of the slots 151; and against the wall of the motor and drive housing 11, by the drawing in of the deflector plate as the buttons are forced to the limit of the slots 151. The deflector plate 18 may be easily removed by gripping a fingerhold 153 (Figs. II and VIII) which is formed at the upper left-hand side of the deflector plate, and sliding the plate to the left. The lower right corner of the deflector plate is shaped to conform substantially to the shape of the foot guard 49 (Fig. IV), and cooperates therewith to guard that portion of the knife which is located above the open end 48 of the trough 46.

*Commodity holder*

Commodities to be sliced on the device are carried by the commodity tray 16, the upper surface of which is substantially trough-shaped, having a long, slightly tilted surface 154 (Figs. VIII, XII and XVII) which is inclined upwardly from front to back and a short sharply inclined surface 155 located at the front of the tray substantially at right angles to the surface 154. These two surfaces 154 and 155 are both at right angles to the face of the gauge plate 14 and the plane of the circular knife 13. The commodity tray is supported on a commodity tray spider 156.

A bracket 157 (Fig. XV) is bolted to two bosses 158 which extend downwardly from the underside of the surface 154. Two bolts 159 pass through the ends of the bracket 157 and through a pair of horizontally-bored ears 160 on the spider 156. The commodity tray 16 is swivelably mounted, and can be swung upwardly and to the right (Figs. VIII and XII), pivoting on the bolts 159 into the position illustrated in Fig. XV. The commodity tray is normally held down in the position shown in Fig. VIII by means of a plunger 161 (Figs. XII and XV) which is horizontally slidable in a pair of ears 162 extending upwardly from the spider 156 and urged to the left by a spring 163 compressed between the ear 162 and a cotter-held washer 164.

A finger grip 165 is riveted on the right end of the plunger 161 (Fig. XV) in a position easily accessible from beneath the commodity tray 16, for withdrawing the plunger from the hole through the left vertical wall of the commodity tray in which the plunger is shown engaged in Fig. XII.

The commodity tray may be locked in its swung-up position by means of a slotted link 165a (Fig. XV), which is pivotally mounted on the innermost end of a bolt 166, and the slot of which is engaged on a bolt 167 horizontally threaded through an ear 168 extending upwardly from the spider 156.

The commodity tray is swivelably mounted in this manner to permit its easy cleaning and to give access to other mechanism located beneath it. In order to prevent slices of commodity from being unevenly cut because the main piece of commodity sags over that end of the commodity tray adjacent the gauge plate 14, the commodity tray is located with its end very close to the plane of the gauge plate (when set at zero) and the circular knife 13. However, small bits of grease and commodity do become distributed over the surface of the gauge plate, below the surface 154 of the commodity tray, and on the end of the commodity tray itself. When the commodity tray is swung upwardly, it is simple to reach these two surfaces for cleaning.

Because it is necessary to have the edge of the commodity tray closely adjacent the plane of the knife 13, provision must be made for the edge of the commodity tray to clear the rear part of the knife guard 12 so that the entire commodity tray can be moved past the exposed cutting portion of the knife to sever completely a slice of commodity. However, since the knife guard 12 covers the knife 13, it projects forward of the plane of the knife edge (as can be seen in Figs. I and XII). Therefore that section of the knife guard 12 which is in the area where the commodity tray passes is cut away (Fig. I). Thus the edge of the commodity tray can be very close indeed to the plane of the knife edge past which it moves, and is not interfered with by the main body of the knife guard 12 (since this portion of the knife guard is located in the dished face of the knife 13), or by the raised annular portion of the guard since the commodity tray passes through a cutout section 169 of the rear part of the knife guard. Cutting away this section of the knife guard however exposes the edge of the knife and would be extremely hazardous to the operator. There is provided therefore an arcuate edge guard 170, which has its forward face in the plane of the edge of the knife, and which conforms substantially to the shape of the edge of the knife. This edge guard is adjustably mounted by means of two bolts passing horizontally therethrough and engaged in two slots horizontally cut in a turned-over section of the knife guard 12. When the knife is sharpened, and thus reduced in diameter, the edge guard 170 can be moved toward the center of the knife to keep its edge closely adjacent to the edge of the knife 13.

In order to hold the commodity against the surface of the gauge plate 14, and to feed it toward the gauge plate as each successive slice is severed, there is provided a commodity clamp 174 (Figs. I, VIII and XVII). The commodity clamp 174 comprises a formed plate 175 which has its lower, front and rear edges turned over. A series of commodity engaging points 176 are riveted into the vertical commodity engaging face of the plate 175 and a barbed channel member 177 is riveted to the underside of the horizontally-turned bottom edge of the plate 175. The front edge of the plate 175 carries a series of pointed projections 178 (Fig. XVII) which serve to pierce and hold in place small commodities which may be placed in the corner between the surfaces 154 and 155 of the commodity tray. The upper rear corner of the plate 175 has an inwardly curved section 179, which is adapted to hold small commodities in the lower front corner of the commodity tray without piercing them.

The plate 175 is swivelably mounted on an arm 180 by means of a horizontal stub shaft which passes through a hole in the center of the plate 175 and is force-fitted into a bore in the end boss of the arm 180. The plate 175 may thus be rotated around the stub shaft to place the projections 178 in commodity-holding position, or to locate the cut-away section 179 in that position. When the curved section 179 is used to hold a small commodity in the corner of the commodity tray, the operator feeds the piece toward the gauge plate with his fingers.

The arm 180 (see Fig. XVII) is hinged in the upright end of an arm 182 of a clamp bracket 183 by means of a horizontal pin 184. The arm 182 projects from beneath the commodity tray 16 and extends upwardly at the rear of the commodity tray. The pin 184 passes through a pair of opposed cylindrical face cams 185 and a cylindrical bearing member, all three of which are journaled in a bore in the upper end of the arm 182. A coiled spring surrounds the pin 184 and exerts tension between one face of the cylindrical bearing member and the rear of the face cam which is pinned to the arm 182. The face of the cylindrical bearing member, opposite the spring, is engaged with the inner surface of one arm of the bifurcated rear end of the clamp arm 180. The face cam 185 is keyed to the other bifurcation of the arm 180. A shoulder is cut in the inner surface of the arm and is engageable with a stop cut on the side of the upper end of the arm 182. Thus when the commodity clamp 174 is swung upwardly, either to permit the plate 175 to be swiveled or to move the commodity clamp out of the way, the two face cams 185 are rotated relative to each other and the commodity clamp arm and plate are cammed to the right in Fig. VIII. The commodity clamp may be raised until the shoulder engages the stop, against which it rests, holding the commodity clamp in its elevated position.

This cam has been provided (as can be seen in Fig. VIII) to prevent the commodity clamp from being swung upwardly when it is at the limit of its travel to the left toward the face of the gauge plate, since if it were then swung upwardly the commodity engaging points 176 would strike against the annular knife-covering portion of the knife guard 12. The commodity clamp is, of course, movable into this extreme left position in order to insure holding and feeding of the commodity until the salt slice has been severed therefrom.

The commodity clamp is movable transversely of the commodity tray 16 toward and from the face of the gauge plate 14, being supported by the commodity tray bracket 183, which rides on three channel rails 193, 194 and 195 (Fig. XV) mounted on the flat top of the commodity tray spider 156. A pair of horizontally journaled rollers 196, which are mounted on the bracket 183, ride in the channel rail 193; a pair of vertically journaled rollers 197 ride in the channel rail 194, and a single roller 198 rides in the channel rail 195. The two rollers 196 guide the commodity clamp bracket 183 and prevent it from turning on a substantially horizontal axis at right angles to its direction of movement. The two rollers 197 prevent the commodity clamp bracket from being swiveled on a substantially vertical axis and the roller 198 prevents the commodity tray from turning on a horizontal axis parallel to its line of movement.

The commodity clamp bracket 183 is urged to the left, i. e., toward the gauge plate, by a spring 199 which is coiled around a horizontal rod 200 mounted in a pair of ears 201 parallel to the rails 193, 194 and 195. The right end of the spring engages the right ear 201, and the left end of the spring is engaged in a collar 202, which is secured to the left side of the bracket 183 (Fig. XVI), and through which the rod 200 passes.

When the commodity clamp is moved to the right (Figs. VIII and XV) and a large piece of commodity placed in the commodity tray 16, between the face of the plate 175 and the gauge plate, the spring 199, which has been compressed by the movement of the commodity clamp bracket to the right, exerts pressure against the commodity clamp bracket and thus against the commodity clamp to hold the commodity snugly against the surface of the gauge plate. The spring feeds the commodity forward as it is sliced until an ear 203 on the commodity clamp bracket 183 engages a stop bolt 204 adjustably threaded in an ear 205 on the commodity tray spider 156, which bolt is so positioned as to stop the movement of the commodity clamp toward the gauge plate just prior to the engagement of the points 176 with the gauge plate.

In case the commodity being sliced is a piece of small cross section, for example bologna or other luncheon meat, it may be desirable to feed it across the commodity tray by hand. The operator then places it in the lower forward corner of the commodity tray and moves it to the left with his fingers. There are provided a hand stop 206 and a thumb guard 207 (Figs. VIII and XVII) to prevent injury to the operator's fingers and thumb. The handle 17 is mounted on the front of the commodity tray 16 by means of two screws, one of them being the screw 166 on which is pivotally mounted the slotted link 165a.

The entire commodity tray and commodity clamp are supported by the commodity tray spider 156, which is in turn bolted to the top of a vertical hollow carriage arm 208 (Figs. VIII, XII and XVII) by means of two bolts 209 which extend upwardly into the commodity tray spider 156. A downwardly extending plate 210, which is a portion of the commodity tray spider 156, forms one side of the hollow carriage arm 208 and serves to correctly position the commodity spider 156 thereon. The carriage arm 208 is an upwardly turned portion of a commodity tray carriage 211 (see also Fig. XIII) which projects through a longitudinal slot 212 in the right side of the base 10 (Fig. I). The carriage 211 is supported by a peripherally-grooved roller 213 which rides on a horizontal rail 214 forming the lower edge of the slot 212 and having its outside flush with the side of the base 10. The roller 213 (as can be seen in Fig. VIII) is located substantially on the center line of the commodity tray 16 and the handle 17 and thus furnishes a "wheelbarrow" support for the commodity tray 16. The carriage 211 is guided and steadied by means of an integrally-constructed sleeve 215 which slides on a rod 216 located in the interior of the base 10 and parallel to the rail 214. The central location of the roller 213 with respect to the weight of the commodity tray and carriage is extremely advantageous, because the weight of the tray and commodity is supported primarily by the friction-free roller rather than by the sliding sleeve 215 and the tray is hence much easier to reciprocate.

In order properly to steady the commodity tray carriage and the commodity tray and to place the principal portion of their weight on the centrally located roller 213, the rod 216 and rail 214 must be spaced as far apart as possible. It is for this reason that the rail 214 is located flush with the side of the base 10, thereby securing maximum spacing between the rail 214 and the rod 216 without having the rail 214 located on the exterior of the base where it would be in the way and would collect dirt and grease, thereby causing friction on its surface and rendering the reciprocation of the commodity tray more difficult.

A double-ended bumper 217 is mounted in the carriage 211 and comprises a plunger 218 which is slidable on a line parallel to the rail 214 and rod 216 in a bore through the body of the carriage 211. A cap 219 having a rubber cushion 220 in its end is secured on each end of the plunger 218 and two cushioning springs 221 are located around the plunger 218, one between each of the caps 219 and the body of the carriage 211.

The rod 216, plunger 218 and roller 213 are all oiled by means of an oiling device comprising an oil tube 222, which extends through the hollow interior of the carriage arm 208 upwardly through the commodity tray spider 156 where its open upper end is easily accessible when the commodity tray 16 is swung up out of the way (Figs. XII and XV). The lower end of the tube is connected by means of an elbow 223 to a horizontal tube 224 which also serves as the axle for the roller 213 and leads to an oil sump 225 in the commodity tray carriage 211. The plunger 218 and rod 216 are oiled by means of wicks 226, which are held in place by a wick retainer 227 attached to the carriage 211. The carriage 211 is held down on the rail 214 by means of a plate 228 secured to the carriage 211 by screws 229 which is engaged beneath the rail 214.

The "wheelbarrow" support for the commodity tray and the wide spacing between the rail 214 and rod 216 result in extremely easy reciprocation of the commodity tray 16, facilitating the operation of the slicing machine. This easy operation is maintained by the constant oiling resulting from the oiling device described.

A slicing machine constructed in accordance with the invention presents a smooth exterior surface unobstructed by screws, fittings or projections other than the sharpener controlling button 99 and a motor switch 230 (Figs. I and XII) which may be mounted in any easily accessible position. The operator can keep the exterior of the machine clean and sanitary since there are no dirt catching nooks, cracks or crannies. After a period of operation when it is desired thoroughly to clean the machine, in compliance with sanitary regulations and requirements, the commodity engaging portions of the machine are all easily accessible or removable. The commodity tray, as explained above, can be swung upwardly to expose the entire surface of the gauge plate. The gauge plate easily can be removed. The unitary knife guard 12 can be lifted from its position around the knife 13, and when so lifted exposes the entire edge of the blade including that portion thereof which extends downwardly into the fore and aft trough 46. Any particles of commodity or dirt can easily be removed from the trough 46 by being swept through the end opening 48 which leads out over the slice-receiving platter 19.

The operational advantages also are many. The rack and pinion drive for the gauge plate gives the operator a great mechanical advantage, and permits close adjustment or rapid movement. The gauge plate being at all times located above the slice-receiving platter prevents any particles of commodity rubbed off by the gauge plate from falling anywhere on the machine except on the slice-receiving platter. The cutout knife guard, with its edge guard, permits the commodity tray to be of substantial size and yet permits the circular knife to be relatively small, since the commodity tray can be moved past the knife guard and thus entirely beyond the exposed forward cutting edge of the knife. The small size of the knife in turn permits the entire machine to be more compact and lighter than would otherwise be possible. The "wheelbarrow" support for the commodity tray eliminates the friction and torsion that bind the reciprocation of commodity trays mounted in other ways.

The embodiment of the invention that has been disclosed may be modified to meet various requirements.

Having described the invention, I claim:

1. In a slicing machine having a rotatable circular knife, in combination, a commodity tray carriage reciprocable fore and aft past the edge of said knife, a commodity tray mounted on said carriage with one of its edges closely adjacent the plane of rotation of said knife, a commodity clamp bracket, means for mounting said bracket comprising a plurality of parallel channels on said carriage extending substantially perpendicular to the plane of rotation of said knife, and a plurality of rollers journaled on said bracket and engaged in said channels, the periphery of each roller being adjacent opposite sides of a channel whereby each roller may roll on either side of a channel without substantial displacement of the roller transverse to the channel, and a commodity clamp mounted on said bracket, the axes of some of said rollers being transverse to the axes of others of said rollers.

2. In a slicing machine having a rotatable circular knife and a base, in combination, a rail mounted in said base substantially parallel to the plane of rotation of said knife, with its outer side lying substantially in the plane of the outer side wall of said base, a slot in such wall of said base, said slot being bounded at the bottom by said rail, a carriage having a part extending exteriorly of said base through said slot and a commodity holder mounted on such part of said carriage, and a supporting roller journaled in said carriage substantially vertically below the center of gravity thereof, to roll on said rail.

3. In a slicing machine having a rotatable circular knife and a base, in combination, a pair of horizontally-spaced rails mounted in said base substantially parallel to the plane of rotation of said knife, a carriage mounted for reciprocal movement along said rails, means for supporting said carriage comprising a roller journaled in said carriage and rolling on one of said rails and a member on said carriage slidingly engaged with the second rail, a slot in the side wall of said base bounded on the bottom by the first rail, said carriage having a portion extending exteriorly of said base through said slot, and a commodity holder mounted on such portion of said carriage, said roller being located substantially vertically below the center of gravity of said carriage and holder.

GEORGE R. WOOD.